United States Patent
Severens

(10) Patent No.: US 8,717,626 B2
(45) Date of Patent: May 6, 2014

(54) PROCESSING OF A DIGITAL MIXED COLOUR DOCUMENT

(75) Inventor: Maurice Eduard Maria Severens, Eindhoven (NL)

(73) Assignee: OCÉ-Technologies B.V., Venlo (NL)

( * ) Notice: Subject to any disclaimer, the term of this patent is extended or adjusted under 35 U.S.C. 154(b) by 2300 days.

(21) Appl. No.: 10/445,049

(22) Filed: May 27, 2003

(65) Prior Publication Data

US 2003/0218777 A1 Nov. 27, 2003

(30) Foreign Application Priority Data

May 27, 2002 (EP) ..................................... 02077078

(51) Int. Cl.
*G06T 5/00* (2006.01)
*H04N 1/40* (2006.01)

(52) U.S. Cl.
USPC ........... 358/2.1; 358/1.9; 358/3.27; 358/1.13; 358/1.18; 358/3.24; 382/173; 382/171; 382/180

(58) Field of Classification Search
USPC ........... 358/2.1, 1.9, 3.27, 1.13, 1.18; 399/54, 399/82; 382/173
See application file for complete search history.

(56) References Cited

U.S. PATENT DOCUMENTS

| | | | |
|---|---|---|---|
| 5,134,666 A | 7/1992 | Imao et al. | |
| 5,576,849 A | 11/1996 | Murakami et al. | |
| 5,856,877 A | 1/1999 | Burger et al. | |
| 6,029,023 A * | 2/2000 | Munemori et al. | 399/66 |
| 6,298,357 B1 | 10/2001 | Wexler et al. | |
| 6,753,976 B1 * | 6/2004 | Torpey et al. | 358/1.9 |
| 6,985,245 B1 * | 1/2006 | Takahashi | 358/1.15 |
| 2002/0051176 A1 * | 5/2002 | Kato | 358/1.15 |
| 2002/0105672 A1 * | 8/2002 | Housel | 358/1.15 |
| 2003/0012429 A1 | 1/2003 | Wang | |

FOREIGN PATENT DOCUMENTS

| | | |
|---|---|---|
| EP | 0 225 100 A2 | 6/1987 |
| EP | 0 881 825 A2 | 12/1998 |
| EP | 1 098 243 A2 | 5/2001 |
| EP | 1098243 A2 * | 5/2001 |
| JP | 2001-148791 | 5/2001 |

\* cited by examiner

*Primary Examiner* — Quang N Vo

(74) *Attorney, Agent, or Firm* — Birch, Stewart, Kolasch & Birch, LLP

(57) ABSTRACT

The present invention is directed to an apparatus and method for the processing of a mixed color document. The mixed color document is preferably a digital structured document containing metadata, such as e.g. a PDF document. The mixed color document is split into at least a first part to be processed in a first processing channel and into at least a second part to be processed in a second, color-dedicated, processing channel. In executing the splitting judgement, color functionality rather than bare color content is taken into account.

23 Claims, 3 Drawing Sheets

PROCESSING OF A DIGITAL MIXED COLOUR DOCUMENT

The present application claims, under 35 U.S.C. §119, the priority benefit of European Patent Application No. 02077078.0 filed May 27, 2002, the entire contents of which are herein fully incorporated by reference.

FIELD OF THE INVENTION

The present invention is related to the processing of digital mixed colour documents and particularly to the reproduction of the digital mixed color documents on digital printing and/or copying systems.

BACKGROUND OF THE INVENTION

A mixed colour document is a document containing both colour and black and white information. Solely for the purpose of this disclosure, colour means all colours excluding black and all shades of grey. The simplest solution to reproduce a mixed colour document is to reproduce it entirely on a colour image reproduction system such as a colour printing and/or copying system. This will also assure the highest level of quality. However, colour image reproduction systems are known to have a higher cost per printed page and/or a lower productivity compared to a black and white image reproduction system. Therefore, particularly in a professional environment such as e.g. the repro department of a company or a print and/or copy shop, where multiple image reproduction systems are available, including a colour image reproduction system and a black and white image reproduction system and/or a colour image reproduction system capable of operating in a "black only" mode, it is desirable to make optimal use of the resources in order to optimize throughput and costs.

Image processing systems are known, as for instance disclosed in European Patent Application Publication EP1098243, and are able to split mixed colour documents into two parts. One part contains all the pages of the mixed colour document with colour information. The other part contains all the pages of the mixed colour document with black and white information. Subsequently, the respective parts are processed by a colour image reproduction system and a black and white image reproduction system respectively. Although this approach may already result in an improvement with respect to throughput and cost, the sole criterion to judge whether or not a page is to be classified as a colour page is the bare presence of some colour information.

More advanced algorithms could be used to provide the operator and/or user with the possibility to define a threshold in the colour content of a page, i.e. the amount of colour information present on the page. Below this threshold, such a page is treated as a black and white page, even although it contains a limited amount of colour information, e.g. a coloured line or bullet. Although this solution may have some merit, a disadvantage of using a colour threshold is that it does not take the nature of the colour information into account nor the user and/or operator intelligence, nor the format and/or purpose of the finally printed reproduction. For instance, the sole colour information of a page may be a coloured line in a graph. In such case it is quite possible that the amount of colour is below the predetermined colour threshold. Consequently, during processing that page is directed towards a black and white printer which may result in an unacceptable loss of information as it is quite possible that the graph can no longer be interpreted by the reader of the reproduced document.

On the other hand, if the sole colour information is some coloured text instead of a coloured line, the loss of information corresponding to the loss of colour could probably be acceptable, even when the amount of colour would be above the colour threshold.

SUMMARY OF THE INVENTION

It is an object of the present invention to provide an image processing system and method enabling the splitting of a digital mixed colour document in at least a first part to be processed in a first processing channel and at least a second part to be processed in a second, colour-dedicated, processing channel, wherein the splitting judgement takes colour functionality into account.

It is a further object of the present invention to provide an image processing system and method enabling the splitting of a mixed colour document in at least a first part to be processed in a first processing channel and at least a second part to be processed in a second, colour-dedicated, processing channel, wherein the user and/or operator is enabled to preview and/or alter the splitting result before actually forwarding the respective parts to the respective image reproduction systems.

An image processing approach of the present invention enables the splitting on page level of mixed colour documents allowing the processing of the split parts in multiple processing channels to achieve user satisfaction and optimizing throughput and cost. This is achieved according to an embodiment of the present invention by incorporating colour functionality, rather than bare colour content, into the splitting decision process. A mixed colour document is a document having at least one page and containing at least one coloured page element. The mixed colour document is preferably a structured digital document, but can be other types of documents. Examples of a structured digital document are page description language (PDL) documents, extensible markup language (XML) documents having a content description format, and any other structured digital document including metadata. Examples of PDL formats are PDF (Adobe), PostScript (Adobe), and PCL (Hewlett-Packard).

Alternatively, the mixed colour document may be a bitmap provided the image information can be reproduced by segmentation as described in U.S. Pat. No. 5,856,877. The document may also be an unstructured digital document, provided it is first converted into a structured document as e.g. described in U.S. Pat. No. 6,298,357 (Adobe Systems).

In a first aspect of the invention a method is directed for processing a digital document having at least one page and containing at least one coloured page element, wherein the document pages are analyzed and coloured page elements identified. The coloured page elements are analyzed as to a desirability to be processed in a colour-dedicated processing channel. Thereafter, the digital document may be split in a first part for processing in a monochrome processing channel and a second part for processing in the colour-dedicated processing channel. The first part of the digital document includes the document pages without coloured page elements for which the desirability to be processed in the colour-dedicated processing channel is established. The second part of the digital document includes the document pages with coloured page elements for which the desirability to be processed in the colour-dedicated processing channel is established. For instance, such a split processing channel configuration may be applied for the printing of digital mixed colour documents, where the monochrome processing channel is a monochrome image reproduction system and the colour-dedicated processing channel is a colour image reproduction system. A colour image reproduction system is a printing or copying system capable of reproducing colour. A monochrome image reproduction system is a printing or copying system capable of reproducing black, including colour image reproduction systems capable of printing in a black only mode.

Alternatively, the split processing channel configuration according to the present invention may also be applied to the archiving of digital mixed colour documents where in the respective processing channels, different compression techniques are employed to process and store the respective parts of the document.

Further according to an embodiment of the present invention, to enable the analyzing of coloured page elements as to a desirability to be processed in a colour-dedicated process channel, for each coloured page element the associated page element type is searched in a page element type list. When the page element type is identified, it is checked whether coloured page elements associated with the page element type are to be processed in the monochrome processing channel or the colour-dedicated processing channel.

In an embodiment of the invention, the image processing method according to the present invention firstly generates a preview of the mixed colour document to enable the categorizing of coloured page elements in page element types. This means that at start, no page element type list is used or such list is empty. While scrolling through the preview of the mixed colour document, or at least the part thereof with the pages containing colour information, the user or operator is enabled to select a coloured page element and to decide for the associated page element type, provided the page element type is recognizable, whether or not the colour information is functional. A page element type where the colour information is considered functional, in other words where the desirability is established to process all the coloured page elements associated with this page element type in a colour-dedicated processing channel, may be labelled accordingly. A page element type can usually be recognized by interpreting the structure information and/or the page element metadata of the (split) document. An example of such a page element type is for instance a hyperlink. Sometimes however, for some page element types, additional information may be required to enable and/or facilitate recognition. An example of such additional information can be positional information. For instance, in case the page element is a logo, the system may well be able to determine whether this page element contains colour, but may have difficulties in recognizing the page element type, i.e., identifying all the colour logos throughout the text and label and processing them as a category. Positional information, e.g. header, footer, upper left/right corner, etc. may facilitate the recognition process. For instance, suppose a logo is considered by the user/operator as a nonfunctional coloured page element, then the identification of colour in a header may be sufficient to classify this as a logo and therefore to process it accordingly. Additional information may include any metadata generated by the user/operator.

After at least one of such categorizing and labelling steps, the image processing system splits the mixed colour document into a functional colour part and a monochrome part, or in case only the colour part is previewed, removes any pages containing non-functional colour information only from the colour part of the mixed colour document and adds these pages to the monochrome part. This may also be done iteratively after each categorizing and labelling step. A list of the page element types, optionally including user defined metadata, and the associated label may be generated separately and stored for later use, e.g. in another job or in an iteration process. Such a list is a so-called page element type list. Information about the split result, such as e.g. the page numbers of the document pages containing functional coloured page elements, may also be stored separately or added as metadata to the split document parts. The updated split may be previewed by the user/operator. In case any additional page element types and/or coloured page elements are identified the whole process may be reiterated.

In another embodiment of the invention, in the image processing method according to the present invention firstly a page element type list is created. Use may also be made of an existing list, e.g. a list generated or used in a previous processing job. To each page element type, a property, e.g. a label, is assigned, or in case of an existing list the label may be altered dependent on the user's preference indicating whether or not the associated colour page elements in the mixed colour document are to be processed in a colour-dedicated processing channel. Subsequently, for each page of the mixed colour document, the image processing system determines in an automated way using the page element type list whether that page includes functional coloured page elements and splits the mixed colour document into at least two parts, i.e. a part including all the pages with functional colour information and a part including all the pages without functional colour information. After the document is split using the page element type list, a preview may be generated to allow the user to identify and label any additional page element types using the method as described in the previous embodiment or to allow the user to alter the label of a page element type.

Further according to an embodiment of the present invention, after splitting of the mixed colour document in at least one functional colour part being the part with pages containing functional coloured page elements and at least one monochrome part being the part without functional coloured page elements, optionally the user is enabled to preview at least the functional colour part and to overrule the split decision on page level. In other words, in case of previewing the functional colour part, the user is enabled to mark a particular page of that functional colour part such that the transfer of that page from the functional colour part to the monochrome part of the mixed colour document is initiated. In case of previewing the monochrome part, the user is enabled to mark a particular page of the monochrome part such that the transfer of that page from the monochrome part to the functional colour part of the mixed colour document is initiated. Alternatively, instead of marking the pages, one may also opt marking the page elements. In other words, in case of previewing the functional colour part, the user is enabled to decide to mark functional colour page elements on a particular page as nonfunctional. If no further functional colour page elements are present on the page, the transfer of that page from the functional colour part to the monochrome part of the mixed colour document is initiated. In case of previewing the monochrome part, the user is enabled to decide to mark a non-functional colour page element on a particular page as functional and to initiate the transfer of that page from the monochrome part to the functional colour part of the mixed colour document.

In another embodiment of the present invention, one may opt to convert non-functional coloured page elements in monochrome page elements. The non-functional coloured page elements may be coloured page elements for which the desirability is established for processing them in a monochrome processing channel.

One may opt to perform such a converting step for those nonfunctional coloured page elements present on document pages of the monochrome part of the document. For consistency reasons, one may also opt to perform such a converting step for all the non-functional coloured page elements associated with a particular page element type. In this latter option, all the coloured page elements associated with a particular page element type are converted to monochrome page elements, irrespective of their presence on pages of the monochrome part or the functional colour part of the document. Consequently, all these page elements have the same appearance in the document when reproduced.

In still another embodiment of the present invention, instead of performing the splitting on a page level, the decision is taken on a sheet level. By doing so, one can take the finishing into account. Examples of finishing which can be taken into account in the splitting decision are e.g. booklet, duplex, multiple-up, cropping, etc.

In another aspect of the invention, an image processing apparatus is directed to processing a digital document having at least one page and containing at least one coloured page element. The image processing apparatus includes a processor for identifying coloured page elements in the document pages and for analyzing the coloured page elements as to a desirability to be processed in a colour-dedicated processing channel. The image processing apparatus may further include a splitter for splitting the digital document into a first part for processing in a monochrome processing channel and a second part for processing in the colour-dedicated processing channel. The first part of the digital document includes the document pages without coloured page elements for which the desirability to be processed in the colour-dedicated processing channel is established. The second part of the digital document includes the document pages with coloured page elements for which the desirability to be processed in the colour-dedicated processing channel is established.

The image processing apparatus according to an embodiment of the present invention may further include a controller wherein the desirability for each coloured page element is determined by searching the associated page element type in a page element type list and controlling whether coloured page elements associated with that page element type are to be processed in the monochrome processing channel or the colour-dedicated processing channel.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

In relation to the appended drawings, the present invention is described in detail in the sequel. Several embodiments are disclosed. It is apparent however that a person skilled in the art can imagine other equivalent embodiments or other ways of executing the present invention, the scope of the present invention being limited only by the terms of the appended claims.

The image processing approach according to the present invention allows splitting mixed colour documents on page level into at least a colour part and at least a black and white part in a smart way, taking into account user intelligence and not just a colour content criterion. A mixed colour document is a document having at least one page and containing at least one coloured page element.

Figure 1:
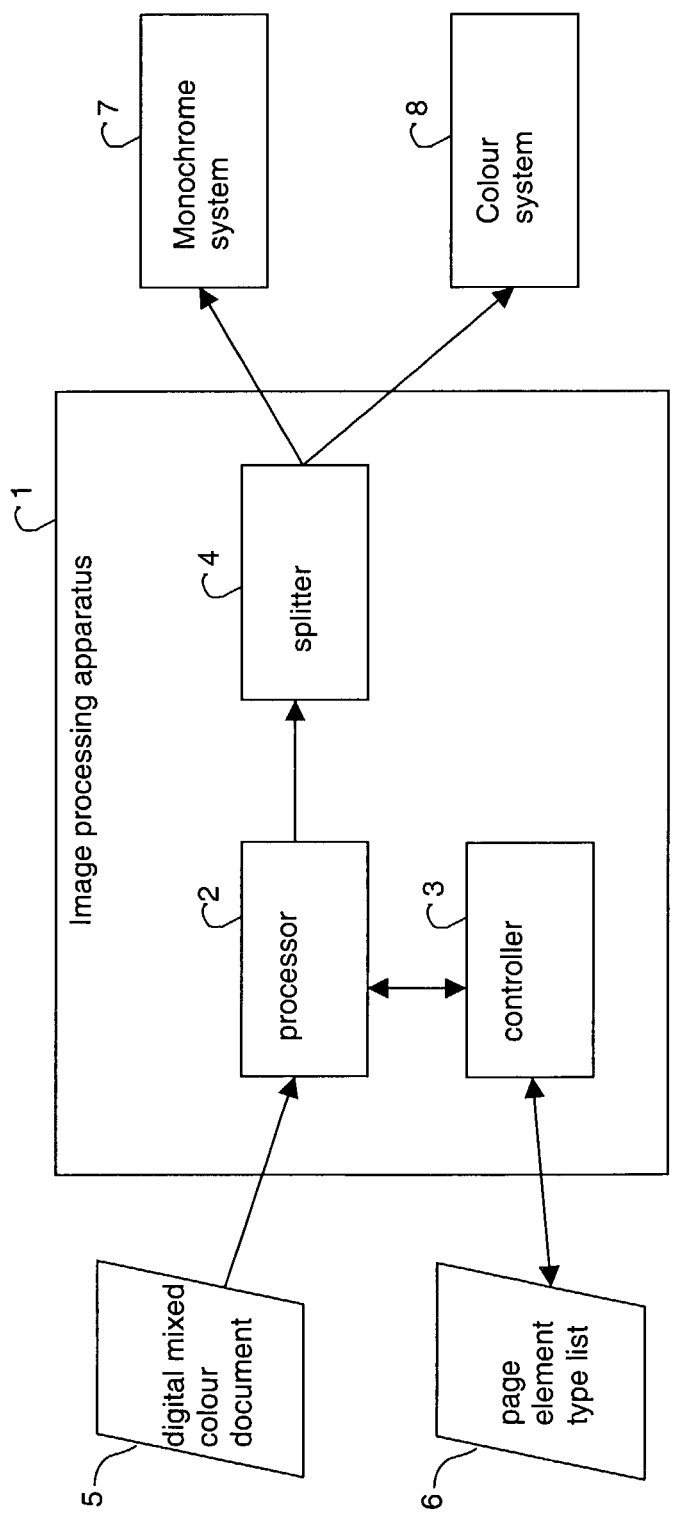
FIG. 1 represents a schematic representation of an image processing apparatus according to an embodiment of the present invention.

According to an embodiment of the present invention, the digital image processing apparatus (1), as schematically depicted in FIG. 1, includes a processor (2), a controller (3) and a splitter (4). A digital mixed colour document (5) is offered to the image processing apparatus, which in an automated way, based on the information present in a page element type list (6), splits the document into a first part for reproduction on a monochrome image reproduction system (7) and a second part for reproduction on a colour image reproduction system (8). All these elements are operatively coupled.

The colour image reproduction system (8) is a printing and/or copying system capable of reproducing colour. The monochrome image reproduction system (7) is a printing and/or copying system capable of reproducing black, including colour image reproduction systems capable of printing in a black only mode. The page element type list (6) is a list of page element types which includes information for each page element type listed indicating the desirability to process the associated coloured page elements on the colour-dedicated system (8) or the monochrome system (7).

Particularly, the processor (2) of the image processing apparatus analyzes the document pages and identifies coloured page elements. Once a coloured page element is identified, the controller (3) uses the metadata and/or structure information of the coloured page element to search the associated page element type in the page element type list (6). Subsequently the controller (3) checks the page element type list (6) whether it is desirable to process the coloured page elements associated with this found page element type on a colour dedicated system such as the system 8. This information is communicated to the processor (2) which searches all the coloured page elements associated with this page element type found in the document and marks them accordingly. Once this is done for all coloured page elements on all pages of the document, the processor (2) marks the document pages of the digital document containing coloured page elements carrying the mark indicating the desirability to be processed by the colour-dedicated system (8). The splitter (4) then splits the digital document such that the marked document pages are directed to the colour-dedicated system (8) and the other pages of the document to the monochrome system (7).

Figure 3:
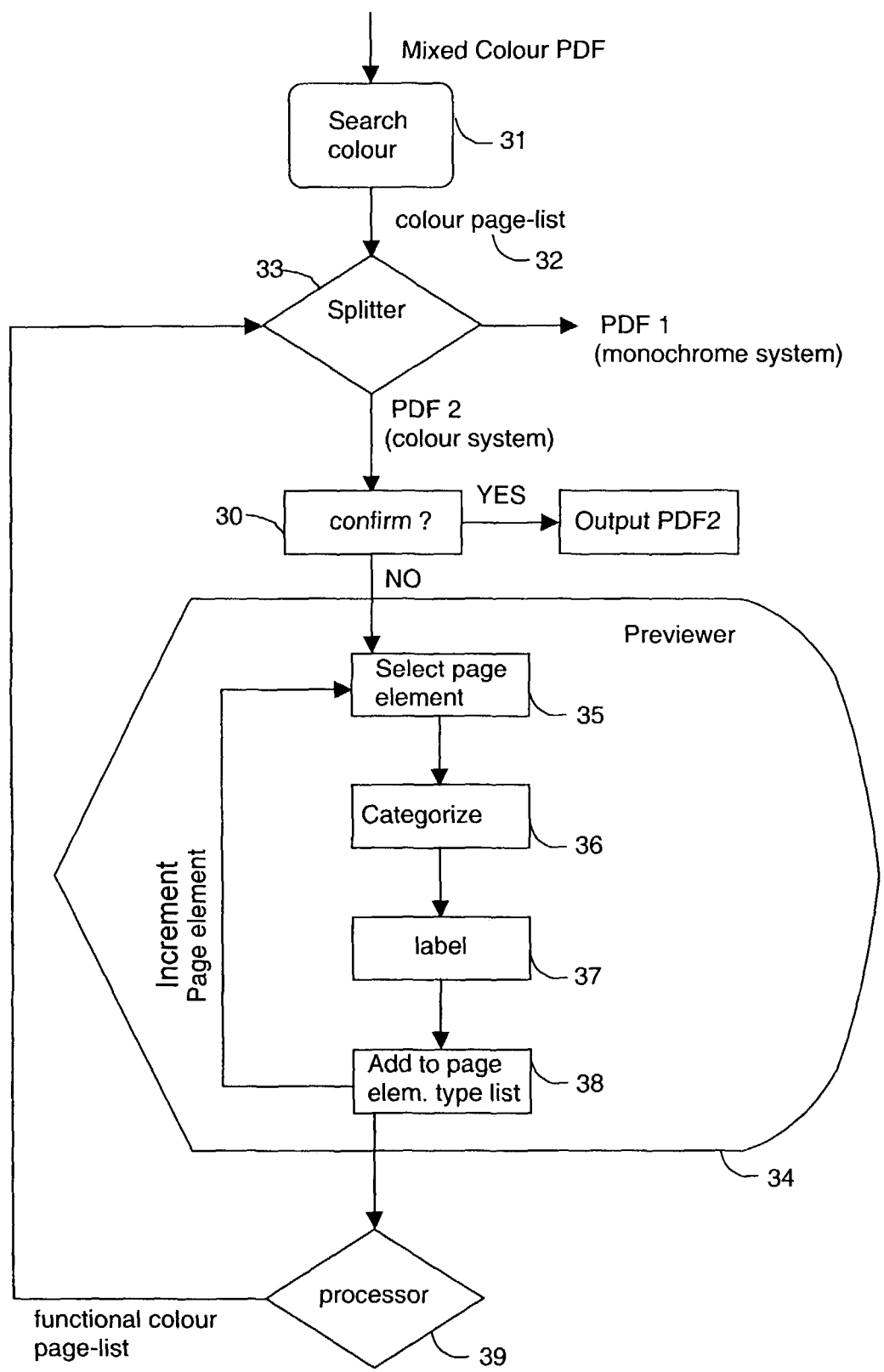
FIG. 3 represents a schematic workflow for splitting a mixed colour document in PDF format, according to an embodiment of the present invention, into a first PDF file for reproduction on a monochrome image reproduction system and into a second PDF file for reproduction on a colour image reproduction system.

Let us assume by means of example that a mixed colour document in a PDF (Portable Document Format of Adobe Systems) format is to be printed. As schematically represented in FIG. 3, the digital mixed colour PDF document is transferred to an image processing system. In this case the image processing system includes a computer (including a full colour screen) which can be coupled by a network or any other interface to a plurality of image reproduction systems. Such an implementation has the advantage that the image processing, or at least the splitting of the mixed colour document can be executed off-line, i.e. independent from the operation of the image reproduction systems, which may be beneficial with respect to the productivity of the image reproduction systems.

Alternately, the image processing system, and particularly the splitting system may be implemented directly either on a colour image reproduction system or on a monochrome image reproduction system provided the colour image reproduction system and the monochrome image reproduction system can be coupled by a network or any other interface. According to this particular embodiment of the present invention, the image processing system firstly addresses the colour searching routine (31) which identifies the pages in the document containing colour data and assembles the page numbers of such document pages. These page numbers may be stored in a separate so-called colour page-list (32) and/or may be added to the original document file as metadata. This identification may take place as schematically represented in FIG. 2.

Figure 2:
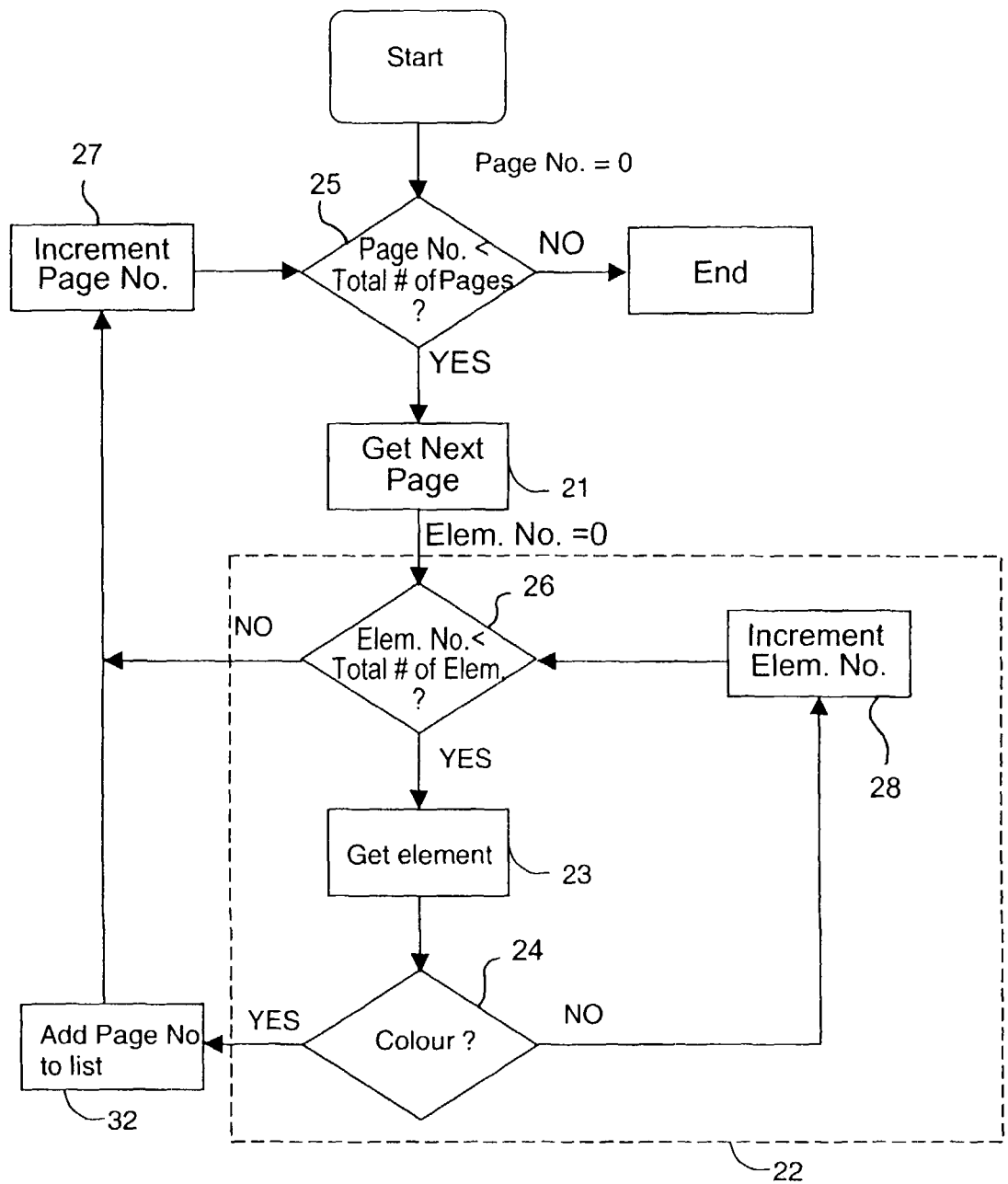
FIG. 2 represents a schematic workflow of the "Search colour" function of FIG. 3 according to an embodiment of the present invention.

Referring to FIG. 2, at the start, the current Page No. is set to 0. Then, if the currently set Page No. is less than the total number of pages in the document (25), then, the next page (or the first page if Page No.=0) of the mixed colour document is retrieved (21). Each page of a PDF document may contain a number of page elements which can be categorised into different types. Examples of page element types include, but are not limited to, photos, graphs, graphics, hyperlinks, logos, coloured bullets in a textual enumeration, text (characters), lines, headers, footers, and repetitive background patterns.

The page elements of each page are processed (22) separately and sequentially. If the currently set page Element No. is less than the total number of page elements in the page (26), then the next page element (or the first page element if Element No.=0) is retrieved (23). If a page element is identified, it is searched for the presence of colour (24). The criterion is absolute: an element is always considered as a coloured element unless it is entirely devoid of colour. But, other criterion may be used depending on the need. If the element is without colour, then Element No. is incremented (28) by a number (e.g., 1) and the process returns to step 26 to process the next available page element in that page. Once a page element is encountered which is judged to be in colour, the corresponding page is considered as a colour page and added to the colour page-list (32). Then, Page No. is incremented (27) by a number (e.g., 1) and the process return to step 25 to process the next available page in the document.

Returning to FIG. 3, The colour page-list (32) is used as an input for the splitter (33) to physically split the mixed colour PDF document into a first PDF file (PDF 1) for reproduction on a monochrome image reproduction system, i.e. the part containing the pages which are not included in the page-list, and into a second PDF file (PDF 2) for reproduction on a colour image reproduction system, i.e. the part containing all the pages identified in the colour page-list. To confirm the split (30), thereafter a preview (34) can be generated of PDF2 on a preview screen and the user or operator is enabled to scroll through PDF2 and select (35) a coloured page element. The user is further enabled to initiate a categorizing step (36) wherein the image processing system determines the associated page element type of the selected colour page element. A page element type is usually recognized by interpreting the structure information and/or the page element metadata of PDF2. Once the page element type is determined, optionally the associated coloured page elements in PDF2 may be marked in the preview in order to assist the user in his judgement whether or not the colour in that page element type is functional. The user is enabled to label (37) that page element type correspondingly. An example of such a page element type is for instance a hyperlink. A hyperlink is easily recognized in a PDF document by the image processing system. A user may judge to label a hyperlink as non-functional, for instance because a coloured hyperlink has only functionality when displayed on a screen of a computer which is connected to the network and has no functionality when printed on paper.

Sometimes however, for some page element types, additional information may be required from the user to enable and/or facilitate recognition. An example of such additional information, or in other words user defined metadata, can be positional information. For instance, the user may be enabled to select a two-dimensional area on the page surrounding the selected coloured page element. Alternatively, instead of selecting a page element and executing the categorising step, the user may opt to supply only a two-dimensional area. In both cases, the two-dimensional area may be defined by the user as a keep out area. The page element type associated with such a keep out area may be considered by the user to contain nonfunctional colour and is labelled correspondingly. An example of such a page element type may be a logo. Examples of such keep out areas may include, but are not limited to, e.g. the page header, the page footer and the upper right corner of a page. Once the page element type is determined and labelled as functional or non-functional, both the page element type as well the associated label may be stored in and/or added to the page element type list (38). Optionally, the user may opt, e.g. for consistency reasons, to convert all coloured page elements, associated with a page element type which is labelled as non-functional, into monochrome page elements.

Thereafter, the selected page element is deselected and the user may select another coloured page element and iterate the above described sequence or a new colour page-list may be generated by the processor using the updated page element type list. Particularly, starting from the first page of PDF2, the page elements of each page are processed separately and sequentially by the processor (39). When a coloured page element is identified, the label of the associated page element type is retrieved from the page element type list. When a page element type carries the label of functional colour, i.e. the desirability is established to process the associated coloured page elements on a colour image reproduction system, all pages comprising such associated coloured page elements are considered as functional colour pages and stored in or added to the functional colour page-list. This functional colour page-list is used as an input for the splitter to physically split the original mixed colour PDF document into a first PDF file (PDF 1) for reproduction on a monochrome image reproduction system, i.e. the part containing the pages which are not included in the functional colour page-list, and into a second PDF file (PDF 2) for reproduction on a colour image reproduction system, i.e. the part containing all the pages identified in the functional colour page-list. As a result, PDF 1 may contain pages without coloured page elements as well as pages comprising nonfunctional coloured page elements. Thereafter, if desirable, the categorizing and splitting sequence may be reiterated till the user confirms (30) the split, in which case the PDF 2 is sent to the colour system 8 for processing.

After splitting the mixed colour document in PDF1 and PDF2, optionally the user is enabled to preview PDF1 and/or PDF2 and to overrule the split decision for individual pages regardless of the nature of the page elements on these pages. Particularly, in case of previewing PDF2, the user is enabled to scroll through PDF2 and to mark a page such that this page is transferred from PDF2 to PDF1 in order to be reproduced on a monochrome image reproduction system. In case of previewing PDF1, the user is enabled to scroll through PDF1 and to mark a page such that this page is automatically transferred from PDF1 to PDF2 in order to be reproduced on a colour image reproduction system. For instance, this latter option may be of particular interest when the page element type is a logo. Suppose a coloured logo is present on each page of the document. The user could treat a logo as non-functional on document level but may prefer to overrule this on page level for the first page of the document. If no further coloured page elements associated with other page element types would be included in the document, then only the first page would be reproduced on a colour image reproduction system such that only the logo of the first page would be rendered in colour.

In still another embodiment of the present invention, instead of performing the splitting on a page level, the decision is taken on a sheet level. By doing so, one can take the finishing into account. An example thereof is duplex, i.e. a sheet carrying an image on each side. In the latter case, suppose one side of the duplex sheet contains functional colour and the other side does not. Then, for instance the image processing system could by default add the entire sheet to the functional colour part, while the user still has the possibility to overrule the selection and decide to assign the entire sheet to the monochrome part. Other examples of finishing which can be taken into account in the splitting decision are e.g. booklet, multiple-up, cropping.

In the present invention, any of the above-discussed user/operator interactions can be achieved via known user interface means such as a graphical user interface (GUI), an input unit such as a keyboard or mouse, voice-activated commands, etc.

The steps of the present method as shown in FIGS. 2 and 3 and discussed above, can be implemented in or by the overall system shown in FIG. 1, or any other suitable system/device. Also, the steps of the present method are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for processing a digital document having at least one page and containing at least one coloured page element, the method comprising:

first analyzing at least one page of the document to determine if the at least one page contains coloured page elements and thus is a coloured page;

if the first analyzing step determines that the at least one page is a coloured page, second analyzing the coloured page elements contained in the at least one coloured page as to a desirability to be processed in a colour-dedicated processing channel or in another processing channel, wherein the step of second analyzing said coloured page elements is made based on whether each of the coloured page elements has a functional colour or a non-functional colour; and selectively processing said coloured page elements in the colour-dedicated processing channel or in the another processing channel based on results of the second analyzing step, wherein the first analyzing step and the second analyzing step are preformed by a digital image processing apparatus.

2. The method as recited in claim 1, wherein said digital document is split into a first part for processing in a monochrome processing channel and a second part for processing in said colour-dedicated processing channel, said first part of said digital document comprising the document pages without coloured page elements for which said desirability to be processed in said colour-dedicated processing channel is established, said second part of said digital document comprising the document pages with coloured page elements for which said desirability to be processed in said colour-dedicated processing channel is established.

3. The method as recited in claim 1, wherein said desirability for each coloured page element is determined by searching an associated page element type in a page element type list and checking whether coloured page elements associated with said page element type are to be processed in a monochrome processing channel or said colour-dedicated processing channel.

4. The method as recited in claim 1, further comprising:
creating a page element type list; and
assigning a property to each page element type of said page element type list indicating the desirability to process coloured page elements associated with said page element type in a monochrome processing channel or said colour-dedicated processing channel.

5. The method as recited in claim 4, further comprising:
recognizing a page element type in said digital document by analysing user-created metadata.

6. The method as recited in claim 4, wherein said digital document is a structured document comprising metadata.

7. The method as recited in claim 6, further comprising:
recognizing a page element type in said digital document by analysing the page element metadata.

8. The method as recited in claim 2, further comprising:
converting the coloured page elements of a page element type for which it is established that the associated coloured page elements are to be processed in said monochrome processing channel, in monochrome page elements.

9. The method as recited in claim 2, further comprising:
generating a preview of at least one of said first part and said second part of said digital document.

10. The method as recited in claim 9, further comprising:
marking a document page of said second part so that said page is transferred from said second part to said first part of said digital document.

11. The method as recited in claim 9, further comprising:
marking a document page of said first part such that said page is transferred from said first part to said second part of said digital document.

12. The method as recited in claim 9, further comprising:
marking functional colour page elements on a document page of said second part so that if no further functional colour page elements are present on said page, said page is transferred from said second part to said first part of said digital document.

13. The method as recited in claim 2, wherein said first part of said digital document comprises document sheets without coloured page elements for which said desirability to be processed in said colour-dedicated processing channel is established, and said second part of said digital document comprises document sheets with coloured page elements for which said desirability to be processed in said colour-dedicated processing channel is established.

14. The method as recited in claim 1, wherein said another processing channel is a monochrome image reproduction system and said colour-dedicated process channel is a colour image reproduction system.

15. The method as recited in claim 1, wherein whether each of the coloured page elements has a functional colour or a non-functional colour is determined based on at least one of page element metadata, structure information, and positional information of each of the coloured page elements.

16. An image processing apparatus for processing a digital document having at least one page and containing at least one coloured page element, said image processing apparatus comprising:
a processor for first analyzing at least one page of the document to determine if the at least one page contains coloured page elements and thus is a coloured page,
if the first analysis determines that the at least one page is a coloured page, for second analyzing said coloured page elements contained in the at least one coloured page as to a desirability to be processed in a colour-dedicated processing channel or in another processing channel, wherein the second analysis is made based on whether each of the coloured page elements has a functional colour or a non-functional colour, and
for selectively processing said coloured page elements in the colour-dedicated processing channel or in the another processing channel based on results of the second analysis.

17. The apparatus as recited in claim 16, further comprising:
a splitter for splitting said digital document into a first part for processing in a monochrome processing channel and into a second part for processing in said colour-dedicated processing channel, said first part of said digital document comprising the document pages without coloured page elements for which said desirability to be processed in said colour-dedicated processing channel is established, said second part of said digital document comprising the document pages with coloured page elements for which said desirability to be processed in said colour-dedicated processing channel is established.

18. The apparatus as recited in claim 16, further comprising:
a controller wherein said desirability for each coloured page element is determined by searching the associated page element type in a page element type list and checking whether coloured page elements associated with said page element type are to be processed in said another processing channel or said colour-dedicated processing channel.

19. The apparatus as recited in claim 16, wherein whether each of the coloured page elements has a functional colour or a non-functional colour is determined based on at least one of page element metadata, structure information, and positional information of each of the coloured page elements.

20. A non-transitory computer-readable medium embodying a computer program product, for processing a digital document having at least one page and containing at least one coloured page element, the computer program product comprising computer-executable instructions for:
first analysing at least one page of the document to determine if the at least one page contains coloured page elements and thus is a coloured page;
if the first analysis determines that the at least one page is a coloured page, second analyzing the coloured page elements contained in the at least one coloured page as to a desirability to be processed in a colour-dedicated processing channel or in another processing channel, wherein the second analysis is made based on whether each of the coloured page elements has a functional colour or a non-functional colour; and
selectively processing said coloured page elements in the colour-dedicated processing channel or in the another processing channel based on results of the second analysis.

21. The non-transitory computer-readable medium as recited in claim 20, wherein said digital document is split into a first part for processing in a monochrome processing channel and a second part for processing in said colour-dedicated processing channel, said first part of said digital document comprising the document pages without coloured page elements for which said desirability to be processed in said colour-dedicated processing channel is established, said second part of said digital document comprising the document pages with coloured page elements for which said desirability to be processed in said colour-dedicated processing channel is established.

22. The non-transitory computer-readable medium as recited in claim 20, wherein said desirability for each coloured page element is determined by searching an associated page element type in a page element type list and checking whether coloured page elements associated with said page element type are to be processed in a monochrome processing channel or said colour-dedicated processing channel.

23. The non-transitory computer-readable medium as recited in claim 20, wherein whether each of the coloured page elements has a functional colour or a non-functional colour is determined based on at least one of page element metadata, structure information, and positional information of each of the coloured page elements.

* * * * *